(12) United States Patent
Brusky et al.

(10) Patent No.: US 7,565,673 B1
(45) Date of Patent: Jul. 21, 2009

(54) APPARATUS AND METHOD FOR USING KEYBOARD MACROS TO CONTROL VIEWING CHANNEL

(75) Inventors: Kevin J. Brusky, Magnolia, TX (US); William H. Ellis, The Woodlands, TX (US); Derrill L. Sturgeon, Houston, TX (US); Kerry L. Brusky, Conroe, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 08/941,174

(22) Filed: Sep. 30, 1997

(51) Int. Cl.
*H04N 5/445* (2006.01)
*H04N 5/50* (2006.01)
*G06F 17/00* (2006.01)

(52) U.S. Cl. .............. 725/53; 725/39; 725/52
(58) Field of Classification Search ........... 348/552, 348/10, 564, 569, 731, 732, 734; 455/186.1, 455/6.3; 706/4 A, 8; 345/168–169, 172; 725/57, 39, 52, 53
See application file for complete search history.

(56) References Cited

U.S. PATENT DOCUMENTS

| | | | |
|---|---|---|---|
| 4,628,541 A | 12/1986 | Beavers | |
| 4,706,121 A * | 11/1987 | Young | 348/552 |
| 4,775,928 A | 10/1988 | Kendall et al. | |
| 4,885,771 A * | 12/1989 | Rabideau et al. | 379/354 |
| 4,959,720 A * | 9/1990 | Duffield et al. | 348/731 |
| 5,045,947 A | 9/1991 | Beery | |
| 5,191,423 A * | 3/1993 | Yoshida | 348/731 |
| 5,276,518 A * | 1/1994 | Shimizu | 348/731 |
| 5,317,403 A * | 5/1994 | Keenan | 725/38 |
| 5,379,454 A * | 1/1995 | Takegawa et al. | 455/158.5 |
| 5,414,426 A * | 5/1995 | O'Donnell et al. | 341/176 |
| 5,543,824 A | 8/1996 | Priem et al. | |
| 5,629,733 A * | 5/1997 | Youman et al. | 725/53 |
| 5,675,390 A | 10/1997 | Schindler et al. | 348/552 |
| 5,812,132 A * | 9/1998 | Goldstein | 715/797 |
| 5,850,340 A * | 12/1998 | York | 725/37 |
| 5,897,619 A * | 4/1999 | Hargrove et al. | 705/4 |
| 5,963,269 A * | 10/1999 | Beery | 348/570 |
| 6,002,394 A * | 12/1999 | Schein et al. | 725/39 |
| 6,002,443 A * | 12/1999 | Iggulden | 348/553 |
| 6,049,796 A * | 4/2000 | Siitonen et al. | 707/3 |
| 6,065,003 A * | 5/2000 | Sedluk | 707/6 |
| 6,133,909 A * | 10/2000 | Schein et al. | 715/721 |
| 6,202,212 B1 * | 3/2001 | Sturgeon et al. | 725/141 |
| 6,388,714 B1 * | 5/2002 | Schein et al. | 348/563 |
| 2001/0041961 A1 * | 11/2001 | Feigen | 701/209 |
| 2004/0210935 A1 * | 10/2004 | Schein et al. | 725/46 |
| 2005/0278741 A1 * | 12/2005 | Robarts et al. | 725/46 |
| 2006/0259940 A1 * | 11/2006 | Fries | 725/131 |

OTHER PUBLICATIONS

Internet Article entitled Destination Features, Gateway 2000 Inc, Aug. 21, 1996.*

Internet Article entitled The Big-Tube PCTV, Ziff-Davis Publishing Company, www.pcmag.com/news/trends/t960528b.htm, May 28, 1996.*

((Various Authors; Wndows Web Disguise, Aug. 1997; vol. 10, No. 8).*

(Continued)

*Primary Examiner*—Reuben M. Brown

(57) ABSTRACT

In a converged computer and television system, the TV network viewed in a TV mode can be changed by entering an alphanumeric channel macro on the computer keyboard.

6 Claims, 3 Drawing Sheets

OTHER PUBLICATIONS (Gavron, et. al, How to Use Microsoft Windows NT4, 1996, Ziff-Davis, p. 7).*

(Gateway 200 Destination, Destination Features, copywrite 1996, printed Aug. 21, 1996).*

"Gateway 2000 Sells Destination Big Screen PC Through Retail Chains"; Internet article; Aug. 20, 1996; pp. 1-4.

"Gateway 2000 Sells Destination Big Screen PC Through Retail Chains"; Internet article; http://www.gw2k.com/CORPINFO/press/1996/destret2.htm; (Aug. 21, 1996); pp. 1-4.

"The Big-Tube PCTV"; *PC Online/ Trends Online*; May 28, 1996; http://www.pcmag.com/news/trends/t960528b.htm (Aug. 21, 1996); pp. 1-3.

"Destination Features"; Internet article; http://198.111.255.58:80/./destination/Info/Feature2.htm (Aug. 21, 1996); pp. 1-5.

"Telefuzion";Internet article; http://telefuzion.com/2/2s.htm (Mar. 12, 1997); pp. 1-2.

Snider, Mike; "High-Tech; Now you can tune your TV to the Internet"; *USA Today*; Sep. 18, 1996; Internet article; http://www.usatoday.com/life/cyber/tech/ct237.htm (Mar. 12, 1997); pp. 1-2.

* cited by examiner

APPARATUS AND METHOD FOR USING KEYBOARD MACROS TO CONTROL VIEWING CHANNEL

BACKGROUND OF THE INVENTION

1. Field of the Invention

The present invention relates to PC/TV systems wherein tunable channels can be accessed via the use of keyboard macros. More particularly, the present invention relates to a personal computer/television system wherein the TV portion of the system can be controlled by a wireless keyboard via performing alpha-numeric macro commands which designate predetermined TV viewing channels.

2. Description of the Related Art

A personal computer/television (PC/TV) convergence device is a fully functional computer emulated with the functionality of a television. The PC/TV may provide a TV mode for viewing television related information (e.g., via broadcast, cable, satellite, VCR, digital disk, or other broadcast media). The PC/TV also provides a computer mode for computing functionality. Thus, the convergence of computer and TV functionalities enables a user to have combined access to television program information, computer related functionality, and the Internet.

A PC/TV convergence device may comprise a fully functional computer which may include a memory, microprocessor, hard drive, floppy disc drive, fax modem, CD-ROM player, keyboard, monitor, power supply, mouse, game pad/joy stick, microphone, etc. The computer is interfaced with a television or monitor such that the television's or monitor's normal National Television Standards Committee (NTSC) signal is converted to a scan "video graphics adapter" (VGA) signal or the computer's scan VGA signal is converted to an NTSC interface signal.

The PC/TV convergence device is controlled by the computer's operating system (OS). The monitor can display both TV programs and computer applications either at the same time (in separate windows) or in separate modes. Furthermore, the convergence of a PC and a TV into a single system permits the utilization of available communication bandwidth, mass storage, and graphic capabilities to store and display applications within a television viewing environment. Basically, the computer is merged with consumer electronic functionality thereby enabling an average consumer to take advantage of many computing functions in an easy to use consumer oriented product.

The PC/TV changes a typical television from a passive device to a user interactive device. For example, while a user is watching TV, the user can request the PC/TV to download information from another source, (besides a TV station) such as the Internet, information about, among other things, the TV program. Such information can originate from a web site or from other data providers.

At present, televisions and personal computers are separate devices. A TV may incorporate a remote control. A standard TV remote control may control a variety of functions of or related to the TV. The remote control transmits infrared (IR) signals to the TV in order to indicate which button on the remote control was depressed.

Also at present, there exists IR computer keyboards. An IR keyboard allows the user to operate a computer without a wire being connected between the IR keyboard and the computer. This provides the user freedom of movement.

Many viewers who view television shows and channels have difficulty knowing or remembering what channel number is associated with what network. The number of channels and networks has greatly increased over the years with the addition of cable networks, direct TV, and satellite networks. Thus, the problem of remembering what channel number is associated with what network worsens.

Many cable and satellite services offer an onscreen program guide. The onscreen program guide alleviates some of the problems associated with networks and channels by providing a chart for the user to view. The program guide chart provides channel numbers and associated network names along with showtime information. The user can page up or down through the guide until the correct channel is on the screen. The user can then select the channel or use the remote to punch in the correct channel number to tune to the selected channel. This task can be a cumbersome process due to 'today's satellite systems having hundreds of channels and each page of the program guide requiring a few seconds to load or move.

Alternatively, a television watcher or user can memorize a favorite list of channels and directly key the channel numbers into their televisions or remote control devices. Most users can only memorize a few channels and therefore must access some kind of TV-guide if they wish to access a network that they have not memorized.

Of course, a user can always access a user guide in the form of a hard copy from a newspaper program guide. The problem with this solution is that there may be a limited availability of hardcopy program guides. Furthermore, the manual method of searching the guide to locate the desired showtime or network channel is time consuming. Still another problem with hardcopy program guides is that they do not always contain the correct channel listing for a desired network when the hardcopy listing is not for the user's satellite or cable service.

Some remote controls, associated with a television, may allow a user to program favorite channels. Such remote controls allow the user to not have to depend on the user's memory, but the user must still be able to remember which remote control buttons go with the networks (i.e., pressing "FAV '1'" goes to NBC and "FAV '2'" goes to CBS, etc.). Still another drawback is that only the person who programmed the remote control knows how the "FAV" (favorite) buttons are coded. And, finally only a limited number of programmable buttons may exist on the TV remote control thereby limiting the number of channels that can be saved.

SUMMARY OF INVENTION

The present invention overcomes the above discussed drawbacks by providing a PC/TV comprising a remote keyboard having macro commands for calling up network stations, individual shows, etc. The macros can be alphanumerically typed into the keyboard as the actual known network or network abbreviation (ex.: NBC, CBC, Showtime, etc.). Software can be used to determine the channel number for each network via the program guide provided by the satellite system or cable system.

BRIEF DESCRIPTION OF THE DRAWINGS

Other objects, features, and characteristics of the present invention as well as methods of operation and functions of related elements of structure, and the combination of parts and economics of manufacture, will become apparent upon consideration of the following description and appended claims with reference to the accompanying drawings all of which form a part of this specification wherein like reference numerals designate corresponding parts in the various figures, and wherein:

DETAILED DESCRIPTION OF THE PREFERRED EXEMPLARY EMBODIMENTS

Figure 1:
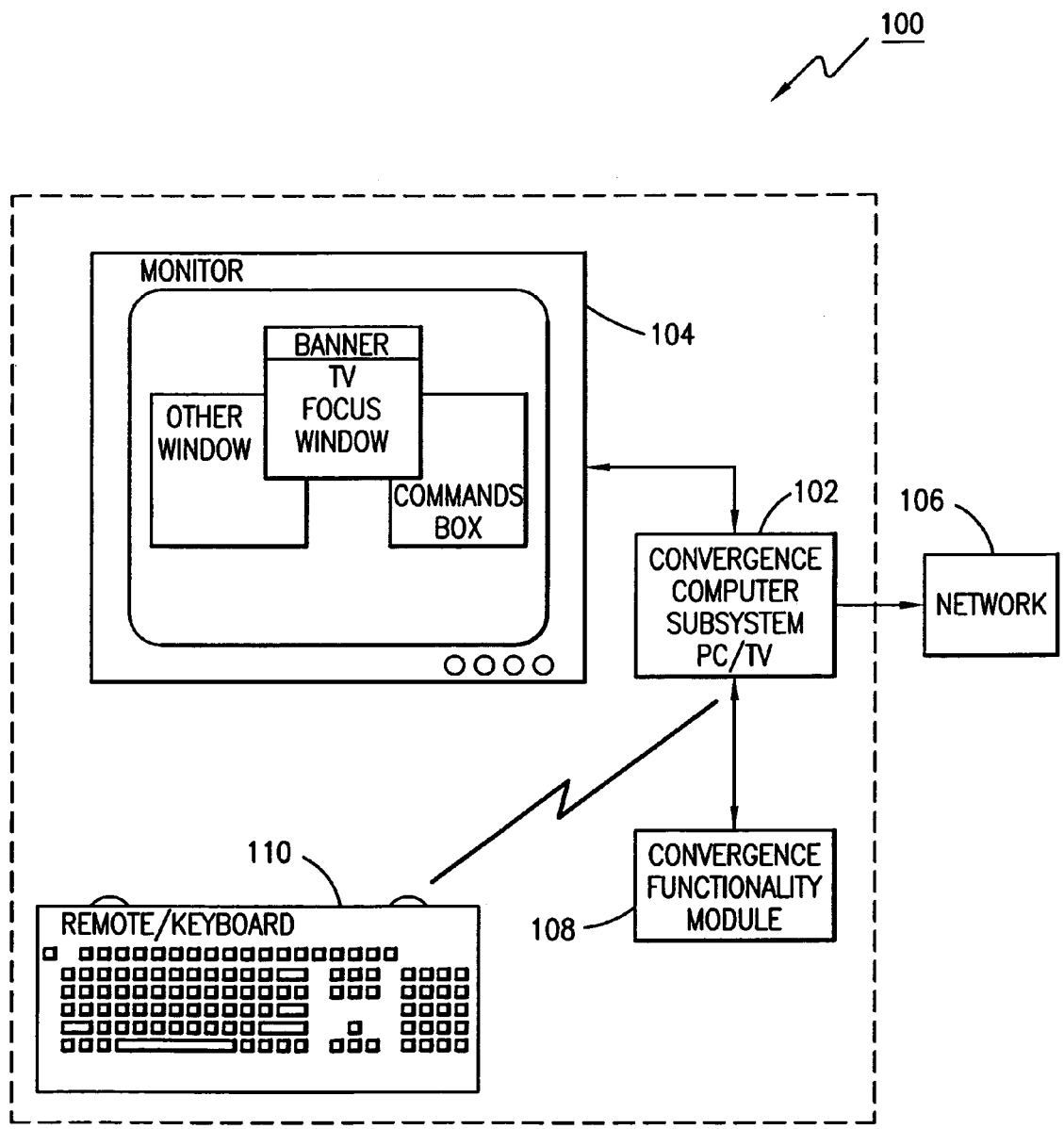
FIG. 1 is an exemplary embodiment of a convergence device in accordance with the teachings of the present invention.

Referring now to the drawings wherein like or similar elements are designated with identical reference numerals throughout the several views, and wherein the various elements depicted are not necessarily drawn to scale, and in particular, to FIG. 1, there is shown a block diagram of a convergence device system 100 utilizing the teachings of the present invention. This block diagram illustrates features of the present invention and basic principles of operation of an exemplary embodiment. The block diagram is not necessarily intended to schematically represent specific modules of hardware or any particular data or control paths therebetween.

The convergence device system 100 includes a computer subsystem 102, a display monitor subsystem 104, operable to receive and display thereon display signals received from the computer subsystem 102. Although not depicted, the subsystem 102 comprises a processor unit coupled to a storage unit, and may further preferably contain a communication port for enabling communication between the convergence device system 100 and a network 106.

The network 106, it is understood, can be any network, for example, a local area network, a telephone communication system, a metropolitan area network, a wide area network, an intranet network, or an internet network. The computer subsystem 102 can be connected to a convergence functionality module 108 that is adapted to receive and/or provide various combinations of composite RF, video, audio, graphics and/or data signals. For example, the module 108 may comprise a receiver for receiving TV signals in any form, such as National Television Standards Committee (NTSC) form or the Phase Alteration Line (PAL) form, via any medium, digital or analog, such as a cable system, a digital satellite system or a network broadcast medium.

In another embodiment, the module 108 may comprise a consumer/home electronics unit adapted to be integrated with the computer subsystem 102. For example, a video gaming unit or a video disc unit may be provided such that the outputs (video, audio, or both) of the units are controlled or modulated by the computer subsystem 102. A video controller service in the subsystem 102 may be responsible for managing these outputs such that appropriately modulated (or decoded or processed) display signals are selected to be forwarded to drive suitable output devices, for example, the display monitor system 104 and/or audio output device (not specifically shown).

Although the module 108 and the subsystem 102 are shown to be two separate yet interconnected entities, the module 108 may, in some embodiments of the present invention, be integrated into subsystem 102. Such an integrated subsystem may comprise in a single housing one or more video sources (or consumer/home electronics units including receivers for TV signals, gaming units, video telephoning units, etc.), a video control device or means for managing and selecting among these sources and for generating appropriate display signals to be provided to suitable output devices, a processor, and data storage devices.

The convergence device system 100 may be operable with an input device 110. The input device may comprise any of the following: a remote control, a standard TV remote control, a remote track-ball/mouse device, a remote pointing device, a wireless keyboard, a wired keyboard, a keyboard integrated with a pointing device or a standard remote control device, et cetera. Furthermore, one of ordinary skill in the art would understand that convergence device systems 100 may contain hardware modules which include, but are not limited to, power supply module, TV tuner circuitry, video imaging circuitry, microphone/audio circuitry, CD-ROM devices, scanning devices, facsimile devices, et cetera.

In an exemplary embodiment of the present invention the input device 110 is a wireless keyboard (a wired keyboard could also be used). The computer subsystem 102 and the convergence functionality module 108 equate to a PC/TV. The input device is designated to be used as a standard computer keyboard when the convergence system is operating in a computer mode. The keyboard also can operate as a TV remote control when the convergence system is operating in a TV mode.

In the present exemplary embodiment, a television can be viewed at least one of two ways. The first technique for viewing television is to place the convergence system in TV mode. The other way to view television is to open a television window (video window) while the convergence system is operating in computer mode. The present apparatus and method provides keyboard macros that are used to access a desired network, TV network or other selectable television, video, or gaming station. The macro could be a station/network abbreviation (ex.: NBC, CBS, ABC). These are called channel macros. Thus, a user could input a channel macro into the keyboard to change the channel.

In a PC/TV convergence system, there may be several tasks occurring simultaneously with the operation of the television. For example, a wordprocessor program and a spreadsheet program may be operating simultaneously with an opened television window. If a channel macro is entered, the channel macro may inadvertently be used by one of the other software programs which are not in control of channel changes.

The present invention may include the ability for at least one of a variety of techniques to enter a channel macro. One technique of entering a channel macro is to require that the PC/TV convergence system apparatus be either be in TV mode or that the video or TV window is the active window (has focus) in the foreground prior to accepting a channel macro.

Another technique for accepting a channel macro is to make use of a specialized key or function key on the keyboard. The function key can be pressed in combination with other keys to produce predetermined key codes. The convergence system (PC/TV) would be "watching" for receipt of these function key codes, filter them out from other character key codes and route the key codes to the software that handles channel/station changes. The advantage to this method is that the TV window does not have to be in the foreground window in order to change channels.

A third technique for operating a channel macro would be to run a dedicated software program in the background to assist the user when entering a channel macro. The advantage of operating dedicated software in the background is that channel changing can be performed by the user when necessary. The dedicated software could present a list of network names which match the text entered by the user. That is, as the user enters each letter of text, a list of network channels is generated to match the text. The dedicated software can anticipate the potential channels the user is going to request.

The user can select a channel from the generated list or continue typing to narrow/shorten the list.

The generated list could appear in a list box window, or on a channel banner on the screen as the user is typing.

The exemplary embodiment can be linked to a program guide provided by a satellite or cable channel provider. This enables the channel macros to operate correctly in different geographical locations where stations, such as NBC or CBS, are associated with different channel numbers in the different locations. In cases where two stations share the same channel at different times of the day, the information provided by the program guide becomes valuable with respect to both the time and the channel that a station can be found via a channel macro.

A user may wish to associate his or her own "abbreviation" for a TV station. For example, if a user wanted to use the call letters of the local affiliate of NBC instead of "NBC" for the channel macro, then the user could configure such a change.

Figure 2:
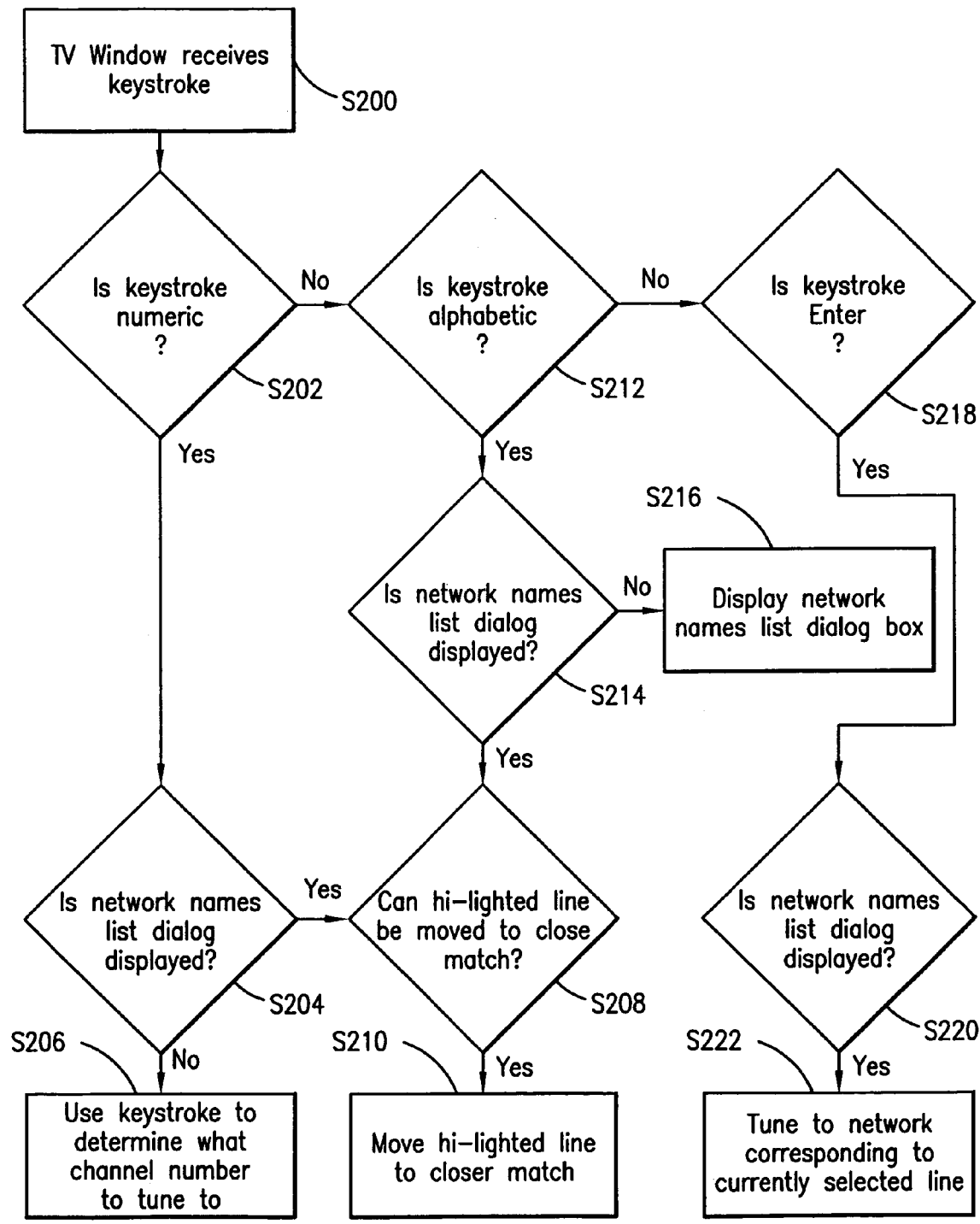
FIG. 2 is a flow chart of an exemplary channel macro function.

Referring now to FIG. 2, a flow chart is depicted to describe how exemplary keyboard macros are used to tune to channels. The flowchart assumes that the PC/TV is on and operating in either TV mode or in computer mode wherein a TV window is open and has focus.

In step S200 the TV window receives a keystroke from an input device, such as a remote control or keyboard. In step S202 it is determined whether the character in the keystroke includes numeric, alphabetic or an enter key information. Other characters, such as function key or specially assigned keys, etc., may be used as well. One of ordinary skill in the art would understand how this exemplary embodiment could be modified to include a variety of keystrokes and commands.

If the keystroke is numeric, then it is determined whether the list of network names is being displayed in step S204. If the network names list is not being displayed, then the keystroke is used as at least a portion of a channel number in step S206.

If, in step S204, the network names list is being displayed to the user, then the number entered is used to determine if a highlighted line in the network names list can be moved closer to a name that matches the keystroke(s) that have been entered in step S208. If the answer in step S208 is yes, then the highlighted line is moved closer to a matching network name in step S210.

Going back to step S202, if the keystroke is alphabetic in step S212 (between A-Z and case insensitive), then it is determined whether the network names are being displayed to the user in step S214. If the network names list is not being displayed to the user, it will be displayed in step S216. When the network names list is displayed, then the highlighted line in the list is moved closer to a matching network name in steps S208 and S210.

Referring back to step S202, if the keystroke is not numeric or alphabetic and is the equivalent of an "enter" keystroke in steps S202, S212 and S218, then it is determined whether the network names list is displayed in step S220 and the PC/TV is directed to tune to the network corresponding to the currently highlighted line in the displayed list of networks in step S222. Note that the user may not have to press "enter" to make a channel selection. The user may move the mouse over a channel entry in the list of network names and, for example, double click the mouse. The list should include all the available networks even though only a subset of them are displayed to the user at any given time. The user may scroll up and down the list so that a view range of networks is displayed and thus, can be selected.

Figure 3:
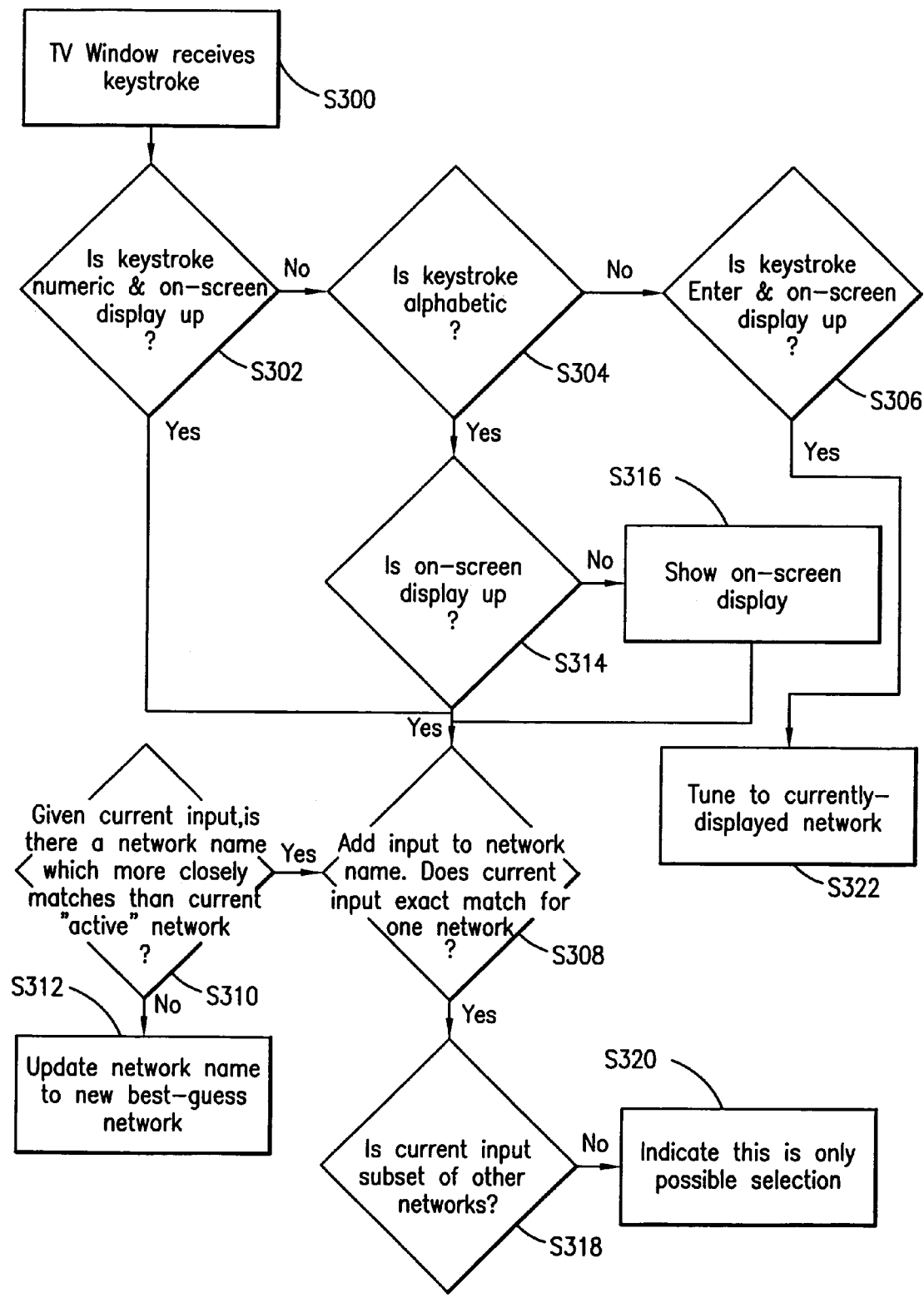
FIG. 3 is a flow chart of another exemplary channel macro function.

Referring now to FIG. 3, another exemplary embodiment of how channel macros operate is depicted. This flow chart is similar to that of FIG. 2, except that there is a single "best-guess" network displayed to the user on the screen display (i.e., the channel banner) instead of bringing a special box which displays a plurality/list of several "best guess" channels.

In step S300 the TV window receives a keystroke from an input device. In steps S302, S304, and S306, it is determined whether the keystroke is numeric, alphabetic or an "enter" keystroke. If in step S302 the keystroke is numeric and an onscreen display is present, then in step S308 the keystroke is added to the current network name. That is, the character that is typed by the user is displayed in a "network channel" area of the display. The network database is then searched to see if the character entry(ies) exactly match one of the network names in a network database. If there is no exact match in step S308, then in step S310, the network name which most closely matches is displayed. In step S312, the network name is updated to a best new guess network.

Referring back to step S308, if the input is an exact match to the beginning characters of one network, then in step S318 it is determined whether there are other names that the current network name is a subset of. If it is not a subset of any other network names, then in step S320 it is indicated that the displayed network is the only possible network selection.

Referring back to step S304, if the keystroke was alphanumeric then it is determined whether the on-screen display is on the screen in step S314. If the on-screen display is not on the screen, then it is put on the screen in step S316. The remaining portion of steps S308, S310, S312, S318 and S320 are the same as described above.

Referring back to step S306, if the keystroke is an "enter" code and the on-screen display is up, then the PC/TV tunes to the channel corresponding to the displayed "best guess" network name.

There are a variety of advantages associated with using embodiments of the present invention. Several aspects of channel selection are made easier to the user. The channel macros are simple to remember because they are simply the network's name. Furthermore, it is possible that the software can obtain network and channel information directly from a downloaded program guide. If an electronic program guide is not available to the user, the user can set up the network database for all the channels that the user is interested, so that channel macros can operate. Furthermore, channel macro use is instantaneous; there is no need for the user to page through a hard copy of a program guide to determine which channel number is associated with which network.

The present invention may incorporate a variety of variations. For example, a user could be able to use the present invention to add macros for other purposes besides network selection. The macros could be for specific television shows. A user could map a television program to a particular channel. The user could then be able to type the first few characters of the program title to switch to the necessary channel. The PC/TV system could optionally notify the user if the present time is not within the proper timeslot for the scheduled program. On systems with an electronic program guide, the system software could automatically access a database containing network, channel and programming information thereby allowing the user to be able to enter "channel macros", "show macros" or "network macros."

One of ordinary skill in the art would understand that the "channel macros" could be used to switch to a predetermined web site, or to start a predetermined game or gaming device. The channel macro in effect could allow a user to switch to any kind of streaming media or any content for which there is data that resides on a hard drive or storage device. Other examples of locations where streaming media is found could be games, gaming devices, locations on the internet, electronic bulletin board services, etc. This invention is not limited to TV tuning, but is related to inputting macros in order to access data/information content.

Thus, a few of the preferred exemplary embodiments of the present invention have been shown and described. It would be appreciated by those skilled in the art that changes may be made in the disclosed embodiments and spirit of the invention, the scope of which is defined in the appended claims.

What is claimed is:

1. In a PC/TV computer system having keyboard for providing alphanumeric characters to said PC/TV computer and also having a display monitor, a method of selecting a network station or an internet site comprising the steps of:

storing predetermined network station and internet site identifiers;

placing said PC/TV computer in a user selectable TV mode providing a full screen display and no user accessible PC functionality or in a Computer mode providing user accessible PC functionality and with a video window in said display being in focus;

effecting a first actuation of an alphanumeric key on said keyboard associated with a network identifier;

creating a monitor display of the or each stored network station identifier or internet site identifier having a first character matching the character associated with said alphanumeric key;

effecting a second actuation of the same or another alphanumeric key on said keyboard;

creating a monitor display of the or each stored network station identifier or internet site identifier containing first and second character matching the characters associated with said first and second alphanumeric key;

if more than one said identifier is displayed, optionally effecting one or more further alphanumeric key actuations and creating a monitor display of the or each stored network station identifier or internet site identifier containing an initial sequence of characters matching the sequence of characters associated with the sequence of alphanumeric key actuations;

effecting user input to the system to mark the or a user selected displayed name having said matching sequence of characters; and then effecting user input to the system to establish communication between the PC/TV computer system and a network station corresponding to the displayed network station identifier or internet site identifier marked by said user input;

wherein at least one of said network station identifiers is a channel macro identifying a selected television program on a particular network station.

2. The method of claim 1, wherein said keyboard is a wireless keyboard.

3. The method of claim 1, further comprising a step of downloading a program guide from a network provider, said program guide providing information that matches network stations with TV channels.

4. The method of claim 1, wherein the or a user selected displayed network station name containing a matching first character is highlighted.

5. The method of claim 1, wherein the step of displaying is performed by providing a channel banner on the display monitor.

6. The method of claim 1, wherein said user input to tune to a network station is effected by user operation of a pointing device.

* * * * *

UNITED STATES PATENT AND TRADEMARK OFFICE
CERTIFICATE OF CORRECTION

PATENT NO.        : 7,565,673 B1                              Page 1 of 1
APPLICATION NO.   : 08/941174
DATED             : July 21, 2009
INVENTOR(S)       : Kevin J. Brusky et al.

It is certified that error appears in the above-identified patent and that said Letters Patent is hereby corrected as shown below:

In column 7, line 33, in Claim 1, delete "character" and insert -- characters --, therefor.

Signed and Sealed this

Tenth Day of November, 2009

David J. Kappos
*Director of the United States Patent and Trademark Office*